(12) United States Patent
Sieker (10) Patent No.: US 9,988,032 B2
(45) Date of Patent: Jun. 5, 2018

(54) RELAY VALVE, VALVE DEVICE, AND VEHICLE ASSOCIATED THEREWITH

(71) Applicant: WABCO GmbH, Hannover (DE)

(72) Inventor: Armin Sieker, Bielefeld (DE)

(73) Assignee: WABCO GmbH, Hannover (DE)

( * ) Notice: Subject to any disclaimer, the term of this patent is extended or adjusted under 35 U.S.C. 154(b) by 106 days.

(21) Appl. No.: 15/027,442

(22) PCT Filed: Sep. 26, 2014

(86) PCT No.: PCT/EP2014/002620
§ 371 (c)(1),
(2) Date: Apr. 6, 2016

(87) PCT Pub. No.: WO2015/058828
PCT Pub. Date: Apr. 30, 2015

(65) Prior Publication Data
US 2016/0236667 A1 Aug. 18, 2016

(30) Foreign Application Priority Data

Oct. 26, 2013 (DE) .......................... 10 2013 017 875

(51) Int. Cl.
*B60T 15/18* (2006.01)
*F16K 31/122* (2006.01)

(52) U.S. Cl.
CPC ........ *B60T 15/182* (2013.01); *F16K 31/1221* (2013.01); *Y10T 137/86919* (2015.04)

(58) Field of Classification Search
CPC .............................................. Y10T 137/86919
See application file for complete search history.

(56) References Cited

U.S. PATENT DOCUMENTS

| 3,730,226 A | 5/1973 | Nelson | |
| 4,018,485 A * | 4/1977 | Fannin | B60T 11/326 303/13 |

(Continued)

FOREIGN PATENT DOCUMENTS

| DE | 2918032 A1 | 11/1980 |
| DE | 10238182 A1 | 3/2004 |

(Continued)

OTHER PUBLICATIONS

European Patent Office, Rijswijk, Netherlands, International Search Report of International Application No. PCT/EP2014/002620, dated Mar. 27, 2015, 2 pages.

*Primary Examiner* — R. K. Arundale
(74) *Attorney, Agent, or Firm* — Brinks Gilson & Lione (57) ABSTRACT

A relay valve (2) includes a housing having a pressure medium inlet that can be connected to a pressure medium source, at least one pressure medium outlet that can be connected to a consumer, at least one control input, and at least one ventilation (32) leading to the atmosphere. The relay valve (2) has further a relay valve piston (14), which is arranged in the housing along a relay valve piston axis (16) in a slidable manner. The relay valve (2) has a first sealing element (54) fixed to the housing, and a second sealing element (56) fixed to the relay valve piston for sealing the relay valve piston (14) with respect to the housing. An annular space (58) having a connection to the atmosphere is defined by the first sealing element (54), the second sealing element (56), the relay valve piston (14), and the housing.

16 Claims, 5 Drawing Sheets

(56) References Cited

U.S. PATENT DOCUMENTS

| | | | |
|---|---|---|---|
| 4,096,884 A * | 6/1978 | Horowitz | B60T 15/18 137/627.5 |
| 4,627,668 A | 12/1986 | Camm | |
| 5,429,424 A | 7/1995 | Huber et al. | |
| 9,328,745 B2 * | 5/2016 | Bartlok | F15B 1/04 |

FOREIGN PATENT DOCUMENTS

| EP | 1844999 A1 | 10/2007 |
|---|---|---|
| GB | 2016100 A | 9/1979 |

* cited by examiner (PRIOR ART)

RELAY VALVE, VALVE DEVICE, AND VEHICLE ASSOCIATED THEREWITH

TECHNICAL FIELD

The invention concerns a relay valve for a compressed air system, a valve device with the relay valve, and a vehicle with the relay valve and/or with the valve device.

BACKGROUND

Relay valves according to the prior art control very large quantities of compressed air, for example for brake cylinders of a compressed air brake system of the vehicle, with very small quantities of compressed air. The relay valve thus accelerates the filling and purging of the brake cylinders.

For this, such relay valves usually have a relay valve piston acting as a control piston which can be pressurized on one side with control pressure via a control chamber, and on the other side with the working pressure provided by a consumer, via a pressure medium output.

An inlet valve is arranged between a filling chamber which can be connected to a pressure medium source via a pressure medium input, and a working chamber which can be connected to a consumer via the pressure medium output. An outlet valve is arranged between the working chamber and a purge chamber leading to atmosphere.

When the control chamber is pressurized with a control pressure, the relay valve piston moves into the working chamber. The movement of the relay valve piston first causes the outlet valve to close and then the inlet valve to open. In this way, a pressure is built up in the working chamber which counters the control pressure on the relay valve piston.

When the pressures acting against each other are in equilibrium, the relay valve piston is moved back against its original movement. The inlet valve closes without the outlet valve opening, so that the pressure in the working chamber and below the pressure medium output is maintained.

When the control chamber is purged, the relay valve piston is moved further against its original movement direction and the outlet valve opens until the pressure in the working chamber has fallen to a value at which the forces on the relay valve piston are again in equilibrium and the outlet valve closes again. On complete purging of the control chamber, the working chamber and hence also the downstream consumers are fully purged. A relay valve working in this way is known for example from EP 1 844 999 A1.

With such a working method of the relay valve, the pressure set at the pressure medium output stands in a design-induced ratio to the control pressure. If for example a 1:1 ratio of the relay valve is desired, a design is necessary in which the size of the active faces of the relay valve piston are the same on the control side and on the working side. This is conventionally achieved by a piston guide introduced into the housing cover. This piston guide in the housing cover must however be sealed against the relay valve piston, whereby machining of the housing cover is essential in order to keep the friction losses at the sealing elements as low as possible and to guarantee tightness.

These known relay valves are usually integrated, together with further components, in a valve device. The valve device may for example be an electronic air preparation device, an electromagnetic parking brake device or an axle modulator.

SUMMARY

The invention is based on the problem of improving such a relay valve or valve device, in particular to allow an economic construction of the relay valve.

The relay valve according to the invention is an air quantity amplifying valve which controls and presents compressed air according to a control pressure provided. The compressed air output controlled according to the control pressure may be provided with a comparatively large air quantity within a short time.

For this, the relay valve has a housing comprising an input which can be connected to a pressure medium source, at least one pressure medium output which can be connected to a consumer, at least one control input and at least one purge leading to atmosphere.

The relay valve furthermore comprises a relay valve piston which is arranged in the housing displaceably along a relay valve piston axis.

The relay valve according to the invention is distinguished by a first sealing element and a second sealing element for sealing the relay valve piston against the housing. The first sealing element is fixedly mounted on the housing and, on movement of the relay valve piston, slides on this relay valve piston. The second sealing element is fixedly arranged on the relay valve piston and, on movement of the relay valve piston, slides on the housing.

Preferably, the sealing elements are configured as Z-rings or as O-rings and arranged in a circumferential groove on the relay valve piston and on the housing respectively.

The first sealing element, the second sealing element, the relay valve piston and the housing together delimit an annular chamber lying between the two sealing elements, wherein the annular chamber is connected to the atmosphere in order to prevent the pressure in the annular chamber being higher than atmospheric pressure, by purging the annular chamber to the atmosphere.

The dimensions of the relay valve piston are selected according to the invention so as to maintain a predefined ratio of control pressure and working pressure, wherein this ratio is predefined by the active face area of the relay valve piston. If for example a 1:1 ratio of the relay valve is required, the annular chamber must be dimensioned such that the active face area of the annular chamber is the same size as the active face area from the purge seat of the relay valve piston. Advantageously, a ratio of control pressure and working pressure—which may be increasing or reducing—may be established particularly easily by the dimensioning of the annular chamber.

The relay valve according to the invention has the advantage that there is no need for cost-intensive production of a housing cover with a piston guide. Thus the relay valve piston has a circular relay valve piston top, whereby no piston guide in the housing cover with additional sealing elements is required. This gives the advantage that the cover of the relay valve can be produced economically, since there is now no need for complex machining.

Furthermore, the cover can be produced economically from plastic, since now it is no longer exposed to the direct loads of the relay valve piston.

According to a preferred embodiment of the invention, the housing according to the invention is formed from a first housing part and a second housing part, wherein the second housing part is constructed as a flat cover which is tightly connected to the first housing part. This advantageously allows a particularly simple and economic production of the relay valve.

A further preferred embodiment of the invention provides a connection of the annular chamber to atmosphere by means of an axial bore in the relay valve piston, wherein the axial bore leads into a purge chamber. Furthermore, the annular chamber is connected to atmosphere via a channel in the relay valve piston which is configured to connect the axial bore to the annular chamber.

By purging the annular chamber according to the invention, for example through the relay valve piston into the purge chamber, advantageously a free movement of the relay valve piston is possible without generating overpressure or underpressure in the annular chamber on movement of the relay valve piston, which is undesirable because such overpressure or underpressure would persistently falsify the valve control.

In a further preferred embodiment of the invention, the size of the annular chamber is adapted to establish a predefined ratio, in particular a 1:1 ratio, of a pressure present at the pressure medium output to a control pressure present at the control input.

The pressure controlled at the pressure medium output stands in a design-induced ratio to the control pressure which may be substantially 1:1 or may be increasing or reducing. The ratio here is predefined by the ratio of the active face areas on the relay valve piston. In a 1:1 ratio of the relay valve, because of the diameter difference, the active face area of the annular chamber is the same size as and opposite to the active face area formed by the purge seat. The ratio can advantageously be adapted individually by suitable dimensioning of the annular chamber.

According to a further preferred embodiment of the invention, a part of the control chamber connected to the control input is separated off as a damping volume. The control chamber and the damping volume are here connected together via a choke.

Due to the pressurization of the control chamber with a pressure medium, the problem may arise that the relay valve piston is set in vibration by the input of pressure medium, since the relay valve piston together with a spring constitutes a vibratable system.

One possible configuration for avoiding vibrations of the relay valve system is disclosed in DE 102 38 182 A1. Here a sealed partition comprising a pressure compensation device is provided in the working chamber. The partition has the function of a baffle and protects the relay valve piston from dynamic gas flow forces. Disadvantageously however, this leads to undesirably pronounced pressure peaks, depending on the size of the connected consumers.

The division of the control chamber according to the invention advantageously leads to a damping of the relay valve piston when the control chamber is pressurized with a control pressure. The damping advantageously prevents the vibrations of the relay valve piston, wherein the damping is dependent on the choke used and the size of the volumes.

In a further preferred embodiment, the damping volume is separated from the control chamber via a diaphragm and an opening in the diaphragm, wherein the opening in the diaphragm is dimensioned such that it acts as a choke. Separation by means of a diaphragm is advantageously easy to produce.

In an alternative embodiment of the invention, the damping volume is arranged inside the relay valve piston, wherein the damping volume and a control chamber connected to the control input are connected together via a choke.

With this arrangement of the damping volume, also the choke advantageously ensures that vibrations of the relay valve piston under pressurization of the control chamber are avoided.

Furthermore, advantageously, the volume of the relay valve piston is utilized and material saved in production.

When the damping volume and the size of the choke are correctly configured, there is a friction-independent, inherent damping of the system, whereby advantageously the vibration behavior of the relay valve piston is suppressed.

The above object is furthermore achieved by a valve device for a compressed air system, wherein the valve device comprises the relay valve according to the invention. The valve device is preferably an electronic air preparation device, an electromagnetic parking brake device or for example an axle modulator or another device for a compressed air system.

Alternatively, the valve device may also be provided in other compressed air systems of a vehicle, for example a goods vehicle.

In a refinement of the valve device, at least one further relay valve is arranged in a valve block, wherein the relay valves are connected together for example via a common purge chamber.

The relay valves may here be arranged close together in the valve block, whereby advantageously a lower weight results due to the smaller dimensions of the valve block. The material saving advantageously leads to lower production costs.

According to an alternative exemplary embodiment, the relay valves have a common port for connection to a compressed air supply, whereby advantageously no second port is required.

The invention furthermore solves the problem on which it is based with a vehicle, in particular a goods vehicle, which comprises at least one relay valve according to the invention and/or at least one valve device according to the invention.

Finally, the invention concerns the use of the relay valve for a compressed air system in a motor vehicle, in particular a compressed air braking system in a heavy goods vehicle. The relay valve is configured here according to the invention and may be used in a valve device according to the invention.

Further embodiments arise from the exemplary embodiments explained in more detail with reference to the drawings.

DETAILED DESCRIPTION OF THE DRAWINGS

Figure 1:
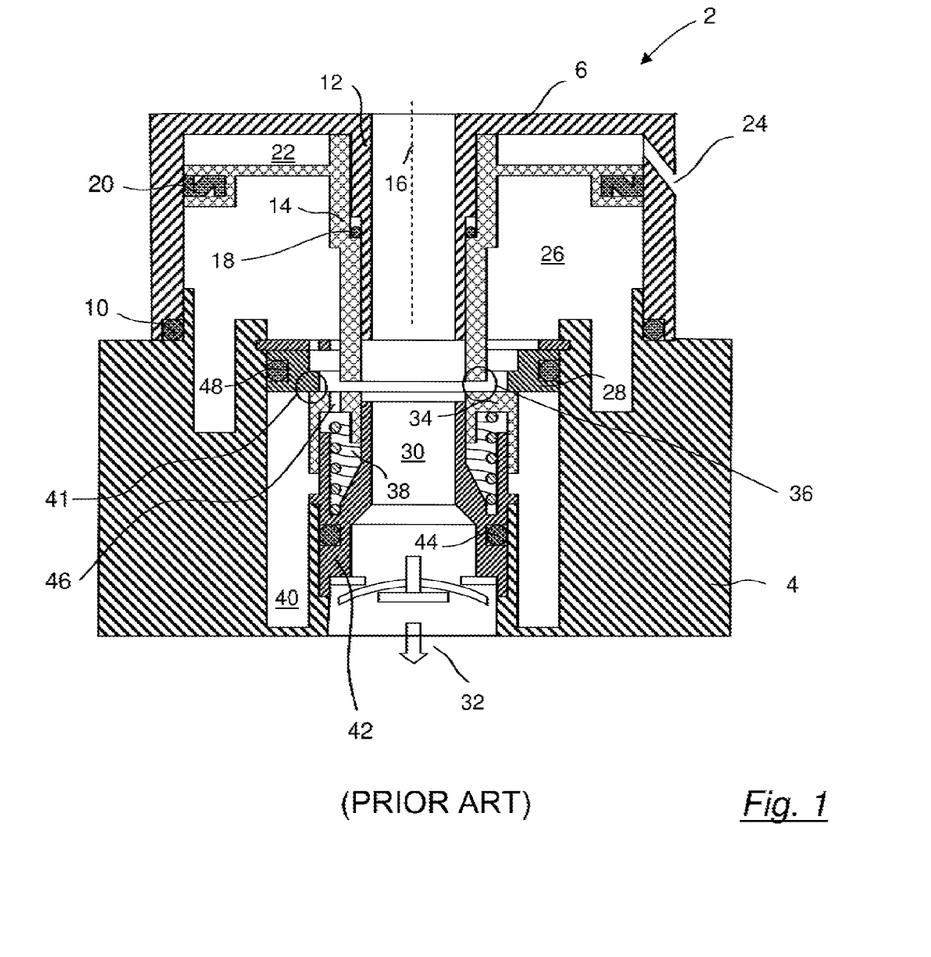
FIG. 1 shows a relay valve according to the prior art.

FIG. 1 shows a relay valve 2 according to the prior art with a housing which is formed from a first housing part 4 and a second housing part 6. The two housing parts 4, 6 are fixedly connected together and sealed against each other by means of a sealing element 10.

The second housing part 6 has a relay valve piston guide 12 protruding far towards the inside, in which a relay valve piston 14 is arranged displaceably along a relay valve piston axis 16. A sealing ring 18 seals the second housing part 6 against the displaceably arranged relay valve piston 14.

On the edge sides of the second housing part 6 runs a sealing ring 20, formed as a Z-ring, which also serves to seal against the displaceably arranged relay valve piston 14.

A control chamber 22 is arranged above the relay valve piston 14 and delimited by the relay valve piston 14 and the second housing part 6. A control pressure can be guided into the control chamber 22 via a control pressure line 24.

The relay valve 2 is shown in a purge position in FIG. 1. For this, compressed air is conducted from a working chamber 26, past an insert 28, into a purge chamber 30 which is connected to atmosphere via an output 32, so that the compressed air to be purged can escape through the purge chamber 30.

In this position, the pressure in the working chamber 26 exceeds the pressure in the control chamber 22, or the two pressures are in equilibrium.

The working chamber 26 has a pressure medium output (not shown here), through which it can be pneumatically connected to a consumer, for example a brake cylinder.

If the pressure in the working chamber 26 is at least as great as the control pressure in the control chamber 22, compressed air is purged from a consumer. However as soon the control pressure in the control chamber 22 is slightly higher than the pressure in the working chamber 26, the relay valve piston 14 assumes a neutral position. In the neutral position, a gap between the relay valve piston 14 and a filling piston 34 is closed, so that an outlet valve 36 pneumatically divides the working chamber 26 from the purge chamber 30.

The filling piston 34 is preferably over-molded with a rubber and held in position by a spring 38.

If the control pressure in the control chamber 22 is increased further, the relay valve piston 14 is moved into a filling position, wherein the control pressure relative to the working pressure is great enough to move both the relay valve piston 14 against its friction at the sealing rings 18 and 20 and the filling piston 34 against the spring force of the spring 38.

In this position, a gap is created between the purge piston 34 and the insert 28 which pneumatically connects a filling chamber 40 to the working chamber 26, and thus an inlet valve 41 opens. The filling chamber 40 is supplied with compressed air from a compressed air source via a pressure medium input, not shown here.

The filling piston 34 and the spring 38 are carried by a carrier element 42 which is inserted in the first housing part 4 and sealed by means of a sealing ring 44.

An opening 46 ensures a pressure balance in the chamber containing the spring 38. A further sealing ring 48 pneumatically seals the first housing part 4 against the insert 28, or the filling chamber 40 against the working chamber 26.

In order to keep the friction forces of the relay valve piston 14 on the second housing part 6, caused by the seals 18 and 20, as low as possible and to guarantee tightness, the second housing part 6 must disadvantageously be extensively machined to achieve a high surface quality.

Figure 2:
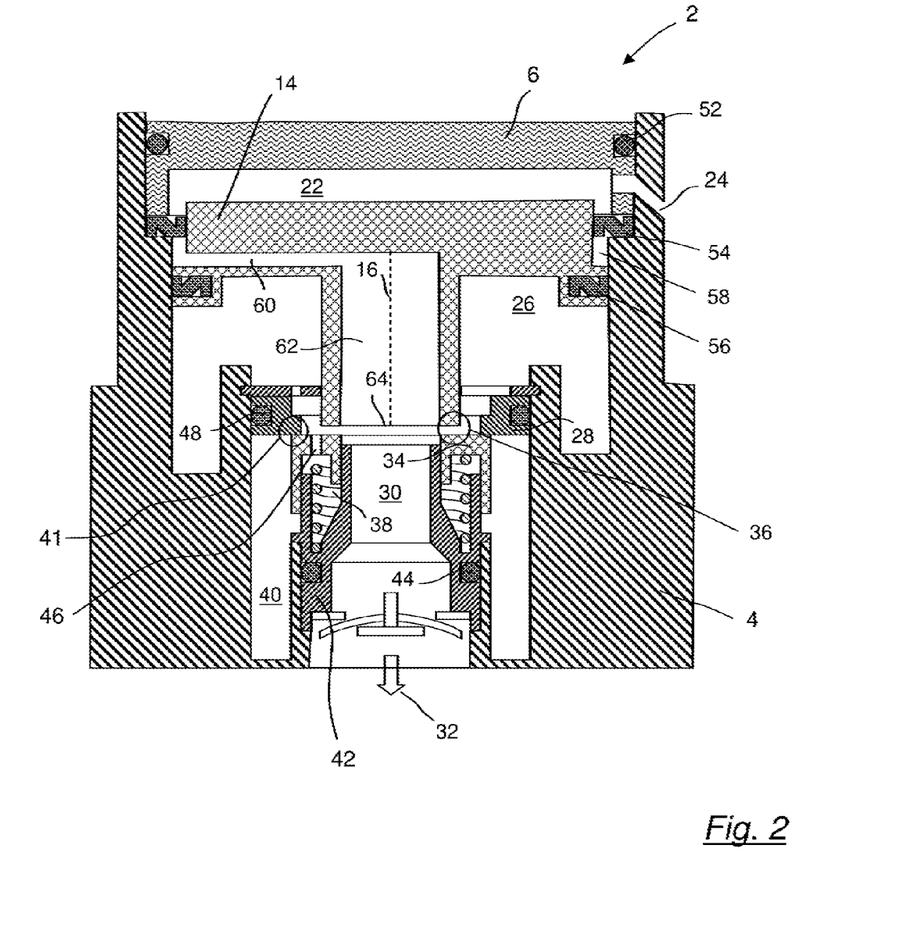
FIG. 2 shows a relay valve according to one exemplary embodiment of the invention.

FIG. 2 shows an embodiment of a relay valve piston 2 according to the invention in which—according to the invention—the second housing part 6 is configured as a flat cover which is tightly connected to the first housing part 4 by means of a sealing ring 52.

A first sealing element 54, in particular a Z-ring, is arranged lying on a shoulder between the second housing part 6 and the first housing part 4, and seals the relay valve piston 14 from the first housing part 4. The sealing element 54 is mounted fixedly on the housing and, on movement of the relay valve piston 14, slides on this relay valve piston 14.

A second sealing element 56 is arranged in a circumferential groove in the relay valve piston 14 and lies fixedly on the relay valve piston 14, sliding in the first housing part 4.

The relay valve piston 14, the first housing part 4 and the two sealing elements 54 and 56 together delimit an annular chamber 58 which is connected to atmosphere via a channel 60 and an axial bore 62 in the relay valve piston 14.

The relay valve 2 shown in FIG. 2 has a 1:1 ratio, where the annular chamber 58 is dimensioned such that, because of the diameter difference, its active face area is the same size as and opposed to the active face area formed by the purge seat 64.

Such an embodiment of the invention advantageously ensures the desired equality of areas on the control side and output side, wherein only the first housing part 4 requires machining, since here only sealing elements 54 and 56 sliding between the housing part 4 and the relay valve piston 14 are provided. The second housing part 6, formed as a cover, can be produced particularly easily and economically, in particular from low-cost plastic.

Figure 3:
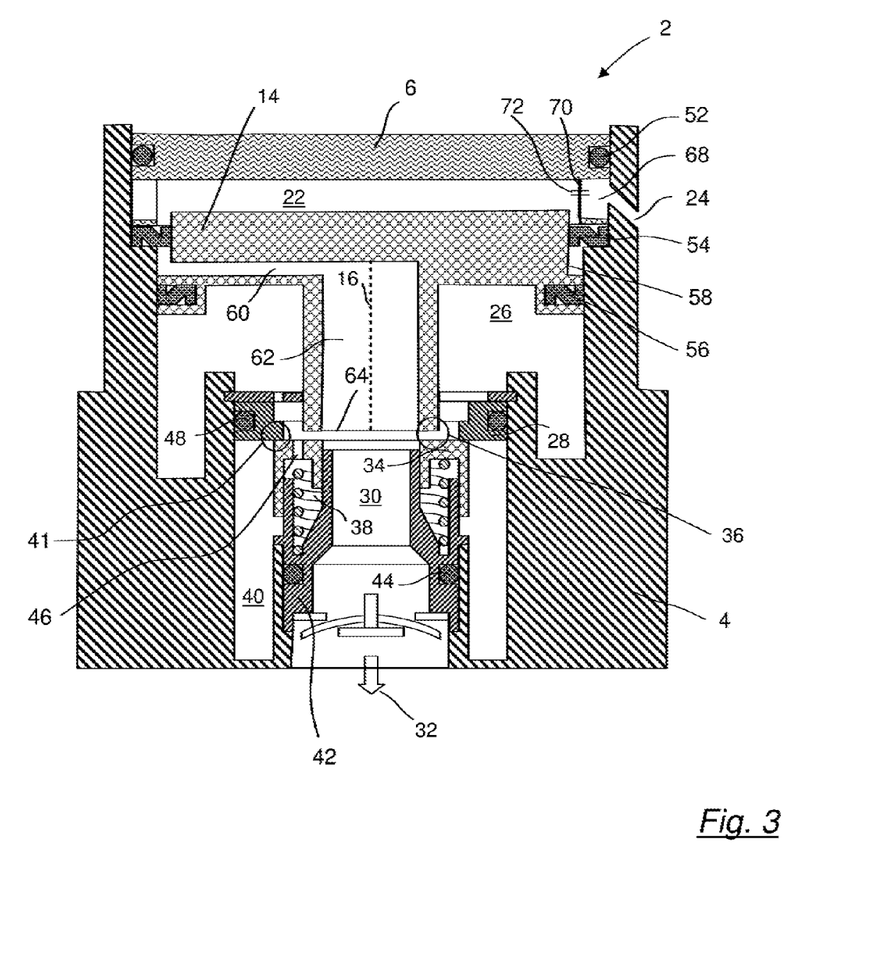
FIG. 3 shows a relay valve according to a further exemplary embodiment of the invention with damping volume connected upstream.

FIG. 3 shows a relay valve 2 according to a further exemplary embodiment of the invention, with a damping volume 68 connected upstream. To separate the control chamber 22 from the damping volume 68, a diaphragm 70 is inserted in the control chamber 22, wherein the diaphragm 70 has an opening 72 acting as a choke. The diaphragm 70 may be configured separately and glued or welded into the control chamber 22, or be taken into account in the construction of the second housing part 6 formed as a cover. The opening 72 in the diaphragm 70 should be dimensioned such that vibrations of the relay valve piston 14 are advantageously avoided.

Figure 4:
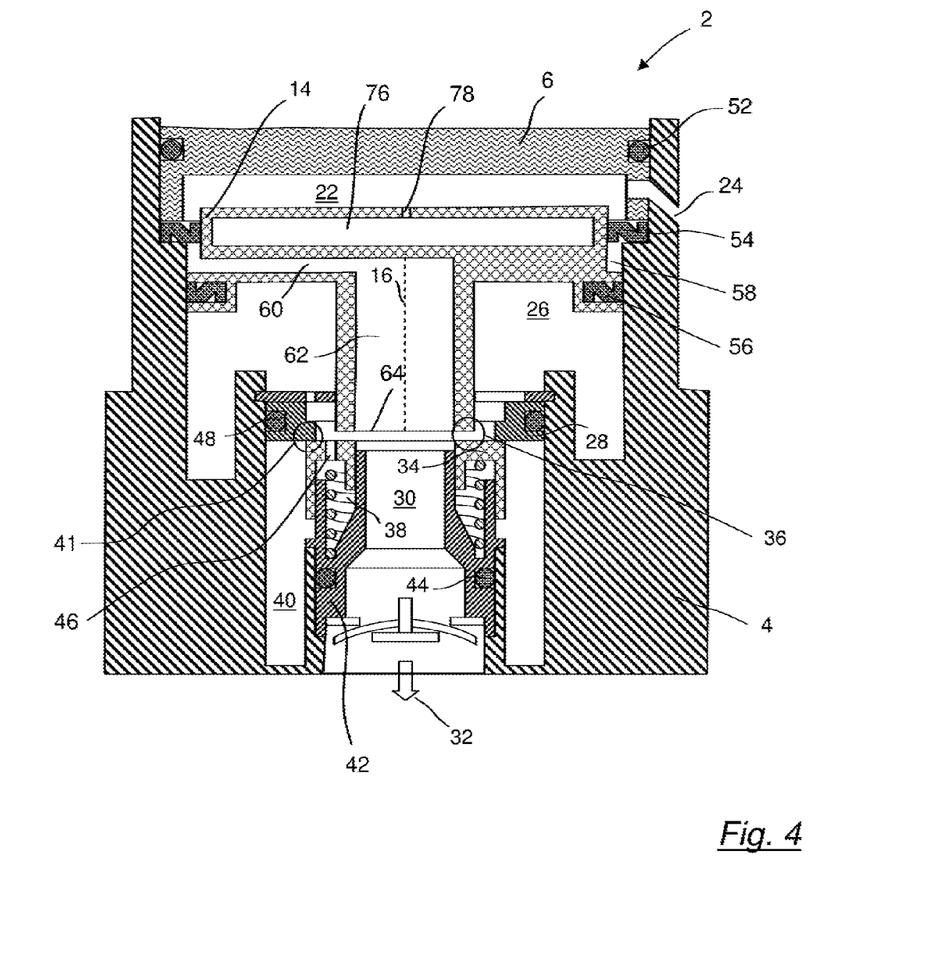
FIG. 4 shows a relay valve according to a further exemplary embodiment of the invention with damping volume connected downstream.

FIG. 4 shows a relay valve 2 according to a further exemplary embodiment of the invention, with a damping volume 76 arranged downstream. According to the invention, this damping volume 76 is arranged in the relay valve piston and connected to the control chamber 22 with a choke 78. When the damping volume 76 and the size of the choke 78 are correctly configured, here too, advantageously, the vibration behavior of the relay valve piston 14 can be suppressed.

Figure 5:
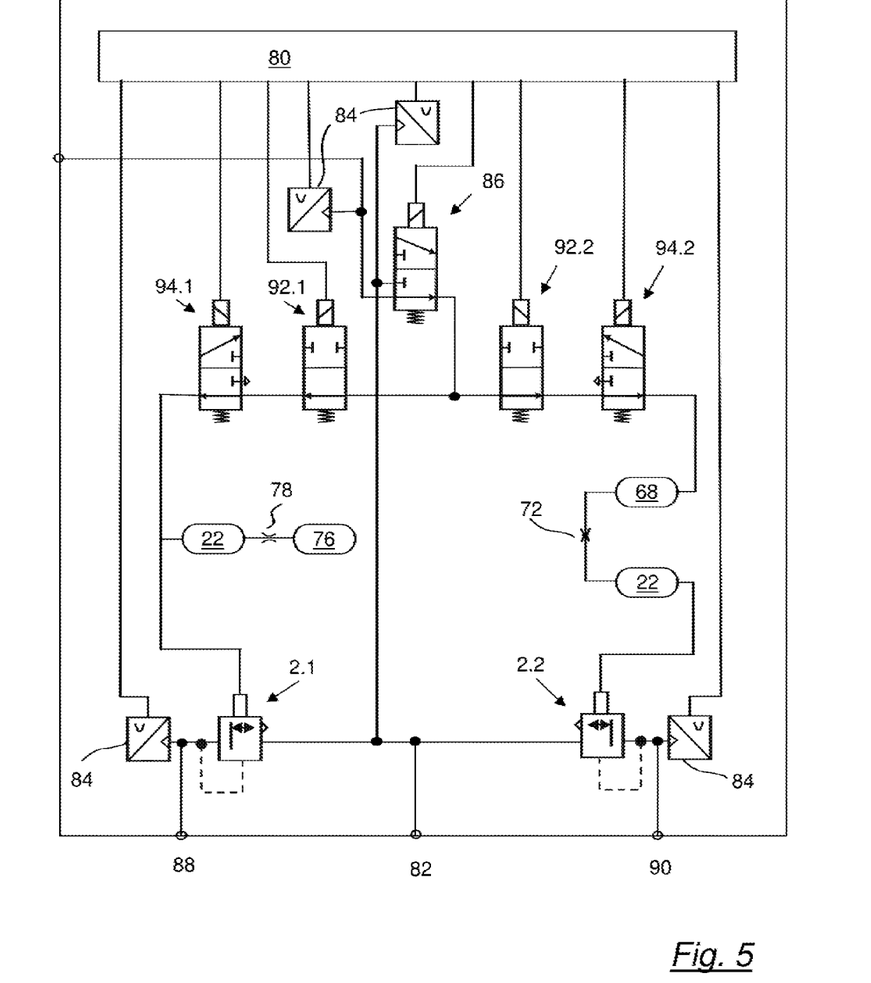
FIG. 5 shows a pneumatic circuit diagram of an EBS trailer modulator.

FIG. 5 shows a pneumatic circuit diagram to explain the use according to the invention of a damping volume 68, 76 arranged upstream or downstream, using the example of an EBS trailer modulator. For the sake of simplicity, here one damping volume 68 is shown connected upstream and one damping volume 76 connected downstream. Preferably however, a symmetrical construction of two upstream or two downstream damping volumes 68 or 76 is implemented. An asymmetric arrangement according to FIG. 5 is not however excluded.

The EBS trailer modulator, shown in simplified form, first has a control electronics unit (ECU) 80 to which the components of the modulator are electrically connected.

Furthermore, the modulator has a port 82, via which the modulator is supplied with accumulator pressure. In addition, as well as a plurality of components, a plurality of pressure sensors 84 is connected to the control electronics 80 and a redundancy valve 86 is provided.

To supply two consumer outputs 88 and 90, two relay valves 2.1 and 2.2 according to the invention are provided, wherein a damping volume 76 is connected downstream of the first relay valve 2.1 and a damping volume 68 is connected upstream of the second relay valve 2.2.

The first relay valve 2.1 is controlled via an inlet valve 92.1 and an outlet valve 94.1, wherein the valves 92.1 and 94.1 may be separately connected to the control electronics 80 in order to maintain pressure, or may have a common port to the control electronics 80, wherein then the pressure line can be filled and purged only by means of the valves 92.1 and 94.1.

The relay valve 2.1 is controlled via a downstream damping volume 76 which is connected to the control chamber 22 of the relay valve 2.1 via a connecting choke 78.

The second relay valve 2.2 is also controlled via an inlet valve 92.2 and an outlet valve 94.2 which are connected to the control electronics 80 in the same way as the valves 92.1 and 94.1.

The control pressure provided by the outlet valve 94.2 passes into the relay valve 2.2 via an upstream damping volume 68 which is connected to the control chamber 22 of the relay valve 2.2 via a connecting choke 72.

The use of two relay valves 2.1 and 2.2 in an EBS trailer module with two upstream or two downstream damping volumes 68 or 76 has the advantage of suppressing the disruptive vibration behavior of the relay valves 2.1 and 2.2. According to the invention, the volumes of the damping volumes 68, 76 and the size of the connecting chokes 72, 78 are dimensioned so as to achieve a friction-independent, inherent damping of the respective systems.

All features cited in the description above and in the claims may be combined both individually and in arbitrary combination with the features of the independent claims. The disclosure of the invention is not therefore restricted to the feature combinations described or claimed. Rather, all feature combinations sensible within the context of the invention are considered disclosed.

While the above description constitutes the preferred embodiments of the present invention, it will be appreciated that the invention is susceptible to modification, variation and change without departing from the proper scope and fair meaning of the accompanying claims.

The invention claimed is:

1. A relay valve for a compressed air system, comprising:
  a housing comprising
    a pressure medium input configured to be connected to a pressure medium source,
    at least one pressure medium output configured to be connected to a consumer,
    at least one control input, and
    at least one purge (32) leading to atmosphere,
  a relay valve piston (14) which is arranged in the housing displaceably along a relay valve piston axis (16),
  a first sealing element (54) for sealing the relay valve piston (14) against the housing, wherein the first sealing element (54) is fixed to the housing,
  a second sealing element (56) for sealing the relay valve piston (14) against the housing, wherein the second sealing element (56) is fixedly arranged on the relay valve piston (14),
  an annular chamber (58) which is delimited by the first sealing element (54), the second sealing element (56), the relay valve piston (14) and the housing, and
  a connection of the annular chamber (58) to the atmosphere,
  wherein a part of a control chamber (22) connected to the control input is separated off as a damping volume (68), the control chamber (22) and the damping volume (68) being connected together via a choke (72), wherein the damping volume (68) is separated from the control chamber (22) via a diaphragm (70), and an opening in the diaphragm acts as the choke (72).

2. The relay valve as claimed in claim 1, wherein housing has a two-part configuration with a first housing part (4) and a second housing part (6), wherein the second housing part (6) is constructed as a flat cover which is sealingly connected to the first housing part (4).

3. The relay valve as claimed in claim 1, wherein the connection of the annular chamber (58) to atmosphere includes an axial bore (62) in the relay valve piston (14), the axial bore (62) leading into a purge chamber (30), and
  a channel (60) in the relay valve piston (14) which is configured to connect the axial bore (62) to the annular chamber (58).

4. The relay valve as claimed in claim 1, wherein the annular chamber (58) has a size adapted to establish a predefined ratio of a pressure present at the pressure medium output to a control pressure present at the control input.

5. The relay valve as claimed in claim 4, wherein the predefined ratio is a 1:1 ratio.

6. A relay valve for a compressed air system, comprising:
  a housing comprising
    a pressure medium input configured to be connected to a pressure medium source,
    at least one pressure medium output configured to be connected to a consumer,
    at least one control input, and
    at least one purge (32) leading to atmosphere,
  a relay valve piston (14) which is arranged in the housing displaceably along a relay valve piston axis (16),
  a first sealing element (54) for sealing the relay valve piston (14) against the housing, wherein the first sealing element (54) is fixed to the housing,
  a second sealing element (56) for sealing the relay valve piston (14) against the housing, wherein the second sealing element (56) is fixedly arranged on the relay valve piston (14),
  an annular chamber (58) which is delimited by the first sealing element (54), the second sealing element (56), the relay valve piston (14) and the housing, and a connection of the annular chamber (58) to the atmosphere,
  wherein a damping volume (76) is arranged in the relay valve piston (14), wherein the damping volume (76) and a control chamber (22) connected to the control input are connected together via a choke (78).

7. The relay valve as claimed in claim 6, wherein the housing has a two-part configuration with a first housing part (4) and a second housing part (6), wherein the second housing part (6) is constructed as a flat cover which is sealingly connected to the first housing part (4).

8. The relay valve as claimed in claim 6, wherein the connection of the annular chamber (58) to atmosphere includes an axial bore (62) in the relay valve piston (14), the axial bore (62) leading into a purge chamber (30), and
  a channel (60) in the relay valve piston (14) which is configured to connect the axial bore (62) to the annular chamber (58).

9. The relay valve as claimed in claim 6, wherein the annular chamber (58) has a size adapted to establish a predefined ratio of a pressure present at the pressure medium output to a control pressure present at the control input.

10. The relay valve as claimed in claim 9, wherein the predefined ratio is a 1:1 ratio.

11. A valve arrangement for a compressed air system, comprising two relay valves, one of which is the relay valve according to claim 1.

12. The valve arrangement as claimed in claim 11, wherein the two relay valves (2) are arranged in a valve block, wherein the two relay valves (2) are connected via a common purge chamber (30).

13. A vehicle comprising at least two relay valves, one of which is the relay valve according to claim 1.

14. A valve arrangement for a compressed air system, comprising two relay valves, one of which is the relay valve according to claim 6.

15. The valve arrangement as claimed in claim 14, wherein the two relay valves (2) are arranged in a valve block, wherein the two relay valves (2) are connected via a common purge chamber (30).

16. A vehicle comprising at least two relay valves, one of which is the relay valve according to claim 6.

\* \* \* \* \*